United States Patent
Hsiao et al.

(10) Patent No.: US 10,079,539 B2
(45) Date of Patent: Sep. 18, 2018

(54) POWER SUPPLY PROTECTION CIRCUIT

(71) Applicant: Powerventure Semiconductor Limited, London (GB)

(72) Inventors: Yuan Wen Hsiao, Hsinchu (TW); Chang Ching Wu, Hsinchu (TW); Chi-Chia Huang, Hsinchu (TW); Der Ju Hung, Taoyuan (TW)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/421,951

(22) Filed: Feb. 1, 2017

(65) Prior Publication Data
US 2018/0219483 A1    Aug. 2, 2018

(51) Int. Cl.
| | |
|---|---|
| *H02M 3/158* | (2006.01) |
| *H02M 1/32* | (2007.01) |
| *H02M 3/156* | (2006.01) |

(52) U.S. Cl.
CPC ............ *H02M 3/158* (2013.01); *H02M 1/32* (2013.01); *H02M 3/156* (2013.01)

(58) Field of Classification Search
CPC ...... H02M 3/156; H02M 3/157; H02M 3/158; H02M 3/1582; H02M 3/1584; H02M 3/1588; H02M 2001/0003; H02M 2001/0009; H02M 2001/322; H02M 1/32
See application file for complete search history.

(56) References Cited

U.S. PATENT DOCUMENTS

| | | | |
|---|---|---|---|
| 4,477,742 A | 10/1984 | Janutka | |
| 4,488,068 A | 12/1984 | Janutka | |
| 4,935,646 A | 6/1990 | Peterson, Jr. et al. | |
| 5,629,542 A | 5/1997 | Sakamoto et al. | |
| (Continued) | | | |

FOREIGN PATENT DOCUMENTS

JP     2004 031980     1/2004

OTHER PUBLICATIONS

"Precision Adjustable Current Limited Power Distribution Switch with 4.5V to 18V Input Voltage, 3A Output Current Synchronous Buck Regulator," Copyright 2012 Texas Insturments Incorporated, TPS65281, TPS65281-1, SLVSBH7B—Jul. 2012, www.ti.com, 34 pgs.

*Primary Examiner* — Emily P Pham
*Assistant Examiner* — Shahzeb K Ahmad
(74) *Attorney, Agent, or Firm* — Saile Ackerman LLC; Stephen B. Ackerman

(57) ABSTRACT

A protection circuit and a method for a high voltage switching regulator is presented. A power supply comprising a switching converter for providing an output voltage is provided. The switching converter is comprised of a first power switch coupled to a second power switch via a switching node, and a driver coupled to the first and second power switches. There is a protection circuit comprised of a first isolation switch coupled to a second isolation switch and a first driver for driving the first isolation switch, and a second driver for driving the second isolation switch. The circuit and method may comprise turning off both the first isolation switch and the second isolation switch when the first power switch and the second power switch are both turned off. This isolates a low voltage domain from a high voltage domain. This prevents current leakages from occurring during switching dead times.

17 Claims, 7 Drawing Sheets

(56) References Cited

U.S. PATENT DOCUMENTS

| | | | |
|---|---|---|---|
| 6,853,170 B2 * | 2/2005 | Miyazaki | H02M 3/156 323/282 |
| 8,058,855 B2 * | 11/2011 | Cheng | H02M 3/1588 323/271 |
| 8,773,091 B2 * | 7/2014 | Hagan | H02M 3/156 323/271 |
| 2001/0046147 A1 | 11/2001 | Liaw et al. | |
| 2009/0213631 A1 * | 8/2009 | Inoue | H02M 1/32 363/127 |
| 2010/0013451 A1 * | 1/2010 | Nakamura | H02M 3/1588 323/282 |
| 2013/0033786 A1 * | 2/2013 | Mao | H02M 1/32 361/18 |
| 2013/0043538 A1 | 2/2013 | Lu | |
| 2014/0021540 A1 | 1/2014 | Khayat et al. | |
| 2014/0021983 A1 | 1/2014 | Khayat et al. | |
| 2015/0002124 A1 * | 1/2015 | Kinoshita | H02M 1/32 323/285 |
| 2015/0061620 A1 | 3/2015 | Ellis | |

\* cited by examiner

POWER SUPPLY PROTECTION CIRCUIT

TECHNICAL FIELD

The present disclosure relates to a protection circuit for power supplies. In particular, the invention relates to a protection circuit for a high voltage switching regulator.

BACKGROUND

Power supplies that include a switching converter such as a buck or a buck boost often require a protection circuit for isolating the core of the integrated circuit from potentially large voltage variations occurring at the switching node of the switching converter.

Existing protection circuits suffer from leakage currents occurring during dead-times of the switching converter.

SUMMARY

It is an object of the invention to address one or more of the above-mentioned limitations. According to a first aspect of the disclosure there is provided a power supply comprising a switching converter for providing an output voltage, the switching converter comprising a first power switch coupled to a second power switch via a switching node, and a driver coupled to the first and second power switches; and a protection circuit comprising a first isolation switch coupled to a second isolation switch; a first driver for driving the first isolation switch, and a second driver for driving the second isolation switch.

Optionally, the first isolation switch comprises a first transistor having a first source terminal and a first drain terminal, and the second isolation switch comprises a second transistor comprising a second source terminal and a second drain terminal, wherein the first drain terminal is coupled to the second drain terminal; and wherein the first source terminal is coupled to the switching node.

Optionally, the power supply comprises a bootstrap circuit for providing a bootstrap voltage; the bootstrap circuit being coupled to both the first power switch and to the first driver.

Optionally, the power supply comprises a comparator comprising a first input coupled to a reference voltage, a second input coupled to the second isolation switch and an output coupled to the driver of the switching converter.

Optionally, the first transistor may be an NMOS transistor and the second transistor may be an NMOS transistor.

Optionally, the first transistor may be a PMOS transistor and the second transistor may be a PMOS transistor.

Optionally, the first isolation switch comprises a first transmission gate and the second isolation switch comprises a second transmission gate.

Optionally, the power supply may be a high voltage power supply, wherein the switching node provides a voltage varying between a negative value and a positive value.

According to a second aspect of the disclosure there is provided a method of operating a power supply comprising a first power switch coupled to a second power switch via a switching node, wherein the first power switch is provided between an input and the switching node and wherein the second power switch is provided between the switching node and a ground; the method comprising providing a protection circuit comprising a first isolation switch coupled to a second isolation switch; a first driver for driving the first isolation switch, and a second driver for driving the second isolation switch; and turning off both the first isolation switch and the second isolation switch when the second power switch is turned off.

Optionally, turning on both the first isolation switch and the second isolation switch when the second power switch is turned on.

Optionally, turning off both the first isolation switch and the second isolation switch when the first power switch and the second power switch are both turned off.

Optionally, the first isolation switch comprises a first transistor having a first source terminal and a first drain terminal, and wherein the second isolation switch comprises a second transistor comprising a second source terminal and a second drain terminal, wherein the first drain terminal is coupled to the second drain terminal; and wherein the first source terminal is coupled to the switching node.

Optionally, the power supply comprises a bootstrap circuit for providing a bootstrap voltage; the bootstrap circuit being coupled to both the first power switch and to the first driver.

Optionally, the protection circuit comprises a comparator, the method comprising comparing a source voltage of the second isolation switch with a reference voltage and generating an error signal based on the comparison.

According to a third aspect of the disclosure there is provided a protection circuit for use with a switching converter comprising a first power switch coupled to a second power switch via a switching node, and a driver coupled to the first and second power switches; the protection circuit comprising a first isolation switch coupled to a second isolation switch; a first driver for driving the first isolation switch, and a second driver for driving the second isolation switch.

Optionally, the first isolation switch comprises a first transistor having a first source terminal and a first drain terminal, and wherein the second isolation switch comprises a second transistor comprising a second source terminal and a second drain terminal, wherein the first drain terminal is coupled to the second drain terminal; and wherein the first source terminal is coupled to the switching node.

Optionally, the protection circuit comprises a bootstrap circuit for providing a bootstrap voltage; the bootstrap circuit being coupled to both the first power switch and to the first driver.

Optionally, the protection circuit comprises a comparator comprising a first input coupled to a reference voltage, a second input coupled to the second isolation switch and an output coupled to the driver of the switching converter.

BRIEF DESCRIPTION OF THE DRAWINGS

The invention is described in further detail below by way of example and with reference to the accompanying drawings, in which.

DESCRIPTION

Figure 1:
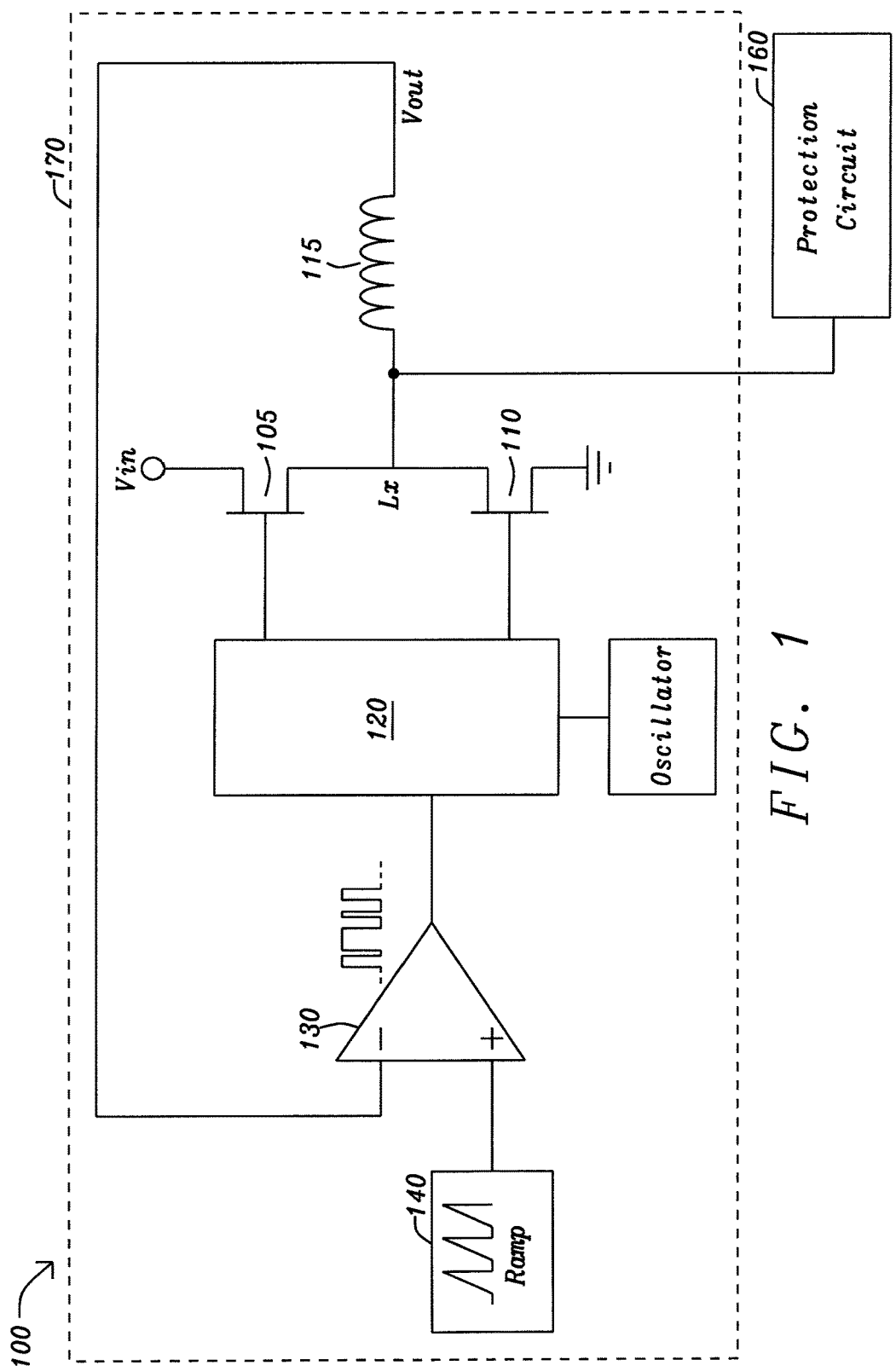
FIG. 1 is a circuit diagram of a buck converter.

FIG. 1 shows a circuit of an exemplary switching converter coupled to a protection circuit. In this example, the switching converter is a buck converter that includes a high side power switch 105, a low side power switch 110, an inductor 115, a gate driver 120, and an output regulation loop for regulating an output voltage of the converter.

The high side power switch 105 has a first terminal coupled to an input for receiving an input voltage and a second terminal coupled to a switching node Lx. The low side power switch 110 has a first terminal coupled to the switching node Lx and a second terminal coupled to a ground. The driver 120 has a first output coupled to a third terminal of the high side power switch 105 and a second output coupled to a third terminal of the low side power switch 110.

The output regulation loop includes a Pulse Width Modulation PWM comparator 130 and a ramp generator 140. The Pulse Width Modulation PWM comparator 130 has a first input for receiving an output voltage Vout of the converter, a second input for receiving a ramp Voltage Vramp, and one output coupled to the gate driver 120. In operation, when Vout is lower than Vramp, the comparator 130 sends a logic low to the gate driver 120. The gate driver 120 then turns on the high side switch 105 for a fixed duration D*T, where D is the duty cycle and T is the switching period. When that fixed duration expires, the gate driver 120 turns off the switch 105 and turns on the switch 110. The output voltage is regulated to be D*Vin, where Vin is the supply voltage.

A protection circuit 160 has an input coupled to the switching node Lx of the switching converter. The protection circuit 160 is arranged to sense the voltage at the switching node Lx.

In addition, in order to prevent the high side switch and the low side switch to be turned on at a same time, the switching converter may be implemented with a dead-time during which both the high side and the low side are turned off (open).

In operation, the switching node of the switching converter experiences large voltage variations. When the high side switch is turned on (closed) the voltage at the switching node increases. For example, the voltage at the switching node may increase to 26V. During the dead time of the switching cycle, the voltage at the switching node may be negative, for example −5V and draw a large current from the substrate of the integrated circuit. For example, the substrate may be a silicon substrate.

Figure 2:
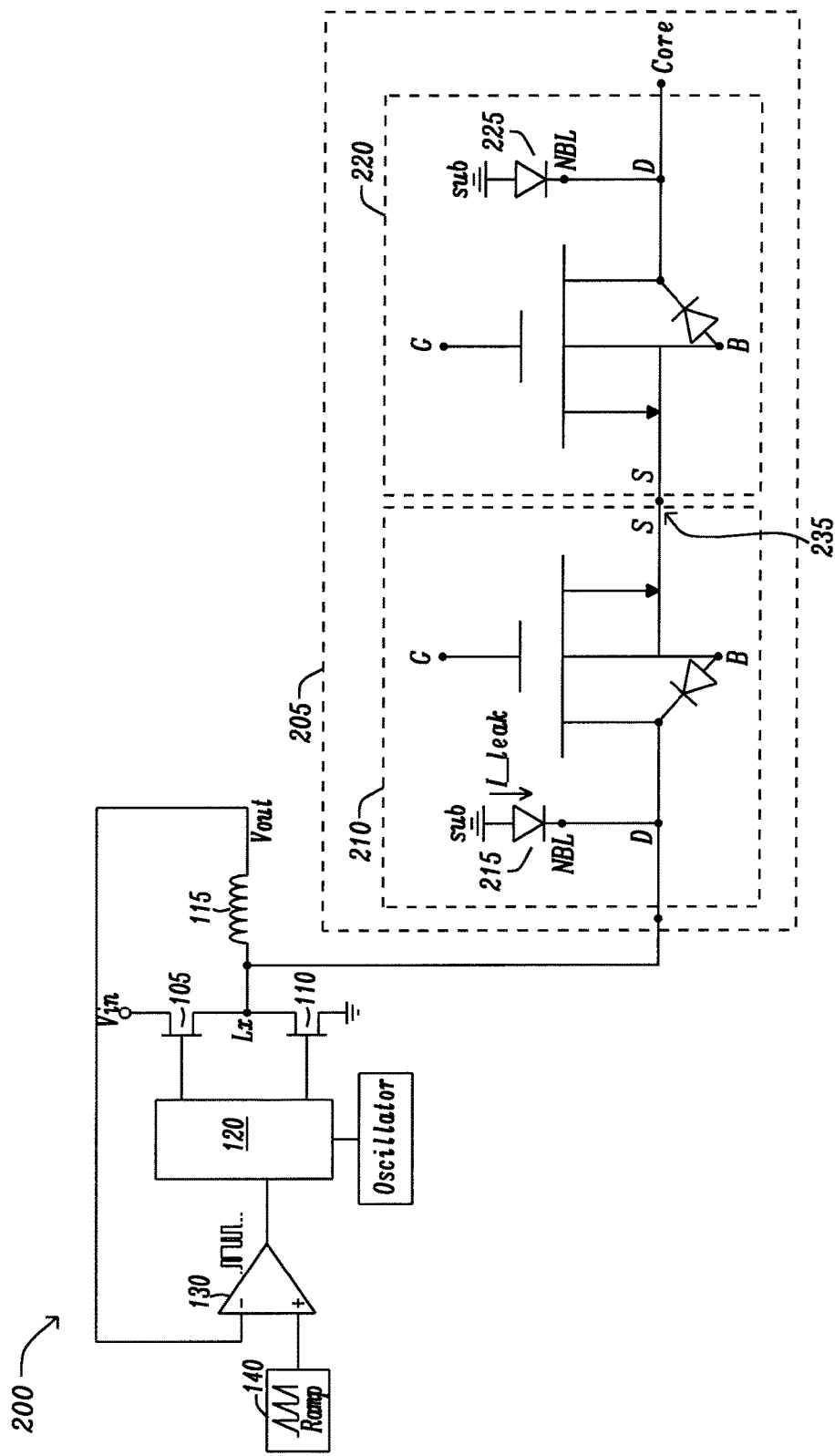
FIG. 2 is a circuit diagram of a buck converter provided with a protection circuit according to the prior art.

FIG. 2 shows a system 200 provided with a protection circuit 205 according to the prior art. The protection circuit comprises a first isolation switch 210 coupled to a second isolation switch 220. The first isolation switch 210 is an NMOS transistor having a drain connected to the switching node Lx of the switching converter and a source connected to a source of the second isolation switch 220. A diode 215 is connected between the drain of the first transistor and the substrate of the integrated circuit. The second isolation switch 220 is also an NMOS transistor having a drain connected to the core of the integrated circuit. A diode 225 is connected between the drain of the second transistor and the substrate of the integrated circuit.

Figure 3:
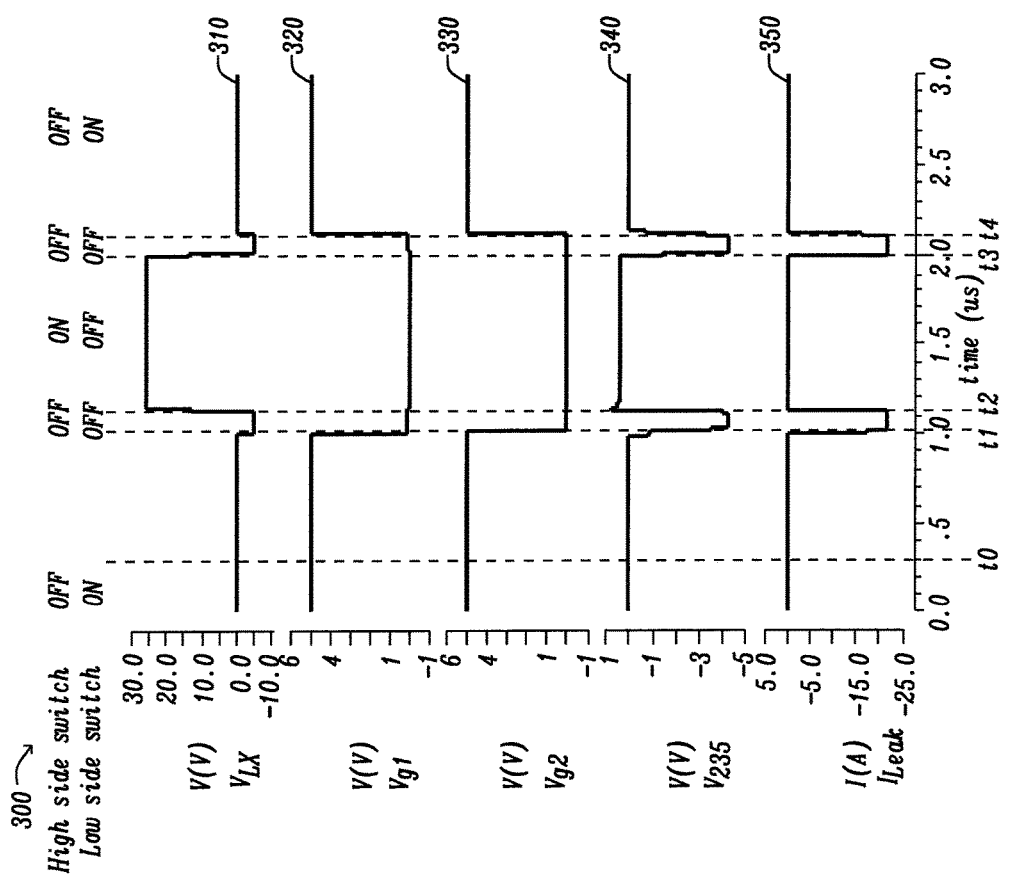
FIG. 3 is a time chart illustrating the working of the circuit of FIG. 2.

FIG. 3 is a timing chart showing the voltage 310 at the switching node Lx; the gate voltage, Vg1 320, of the first transistor; the gate voltage, Vg2 330, of the second transistor; the voltage 340 of the source common 235 to both the first and the second transistors; and a leak current I_leak 350 from the substrate of the integrated circuit to the drain of the first circuit.

The switching node voltage 310 varies depending on a state, on or off, of the high side switch 105 and the low side switch 110.

At time t0, the high side switch is off (open) and the low side switch is on (closed), the switching node voltage 310 is 0V.

At time t1, the low side switch is turned off. Between the times t1 and t2, also referred to as dead time, both the high side and the low side switches are turned off, and the voltage 310 is negative. In this example the voltage is −5V.

At time t2, the high side switch is turned on (closed), and the voltage 310 increases to a maximum value, for example 26V. Between times t2 and t3, the voltage 310 remains at it maximum value.

At time t3, the high side switch is turned off. Between the times t3 and t4 both the high side and the low side switches are turned off. The voltage 310 is negative with a value of −5V.

At time t4, the low side switch turns on and the voltage 310 increases to 0V.

The source voltage 340, common to both the first and the second transistors 210, 220 is constant at about 0V before time t1 and becomes negative at time t1. The voltage 340 is about −4V during the dead time t2−t1. At time t2 the source voltage 340 becomes positive, and remains positive until time t3. At time t3, the source voltage becomes negative. The voltage 340 is about −4V during the dead time t4−t3.

During the dead times t2−t1 and t4−t3, the leakage current 350 is negative with a value of about −20 A.

When the high side switch is on, the switching node voltage is high, about 26V. This high voltage could damage the core of the integrated circuit. The first transistor 210 is used to isolate the core from the switching node voltage 310. Between times t1 and t4, the gate voltage 320 of the first NMOS transistor is low. During the period t4−t1, the first transistor is switched off (open). In this way, the core is isolated from the high voltage of the switching node Lx.

However, during the dead times of the switching node Lx, the voltage 310 is negative, for example −5V. During this time the diode 215 is forward biased and draws a large current from the substrate.

Figure 4:
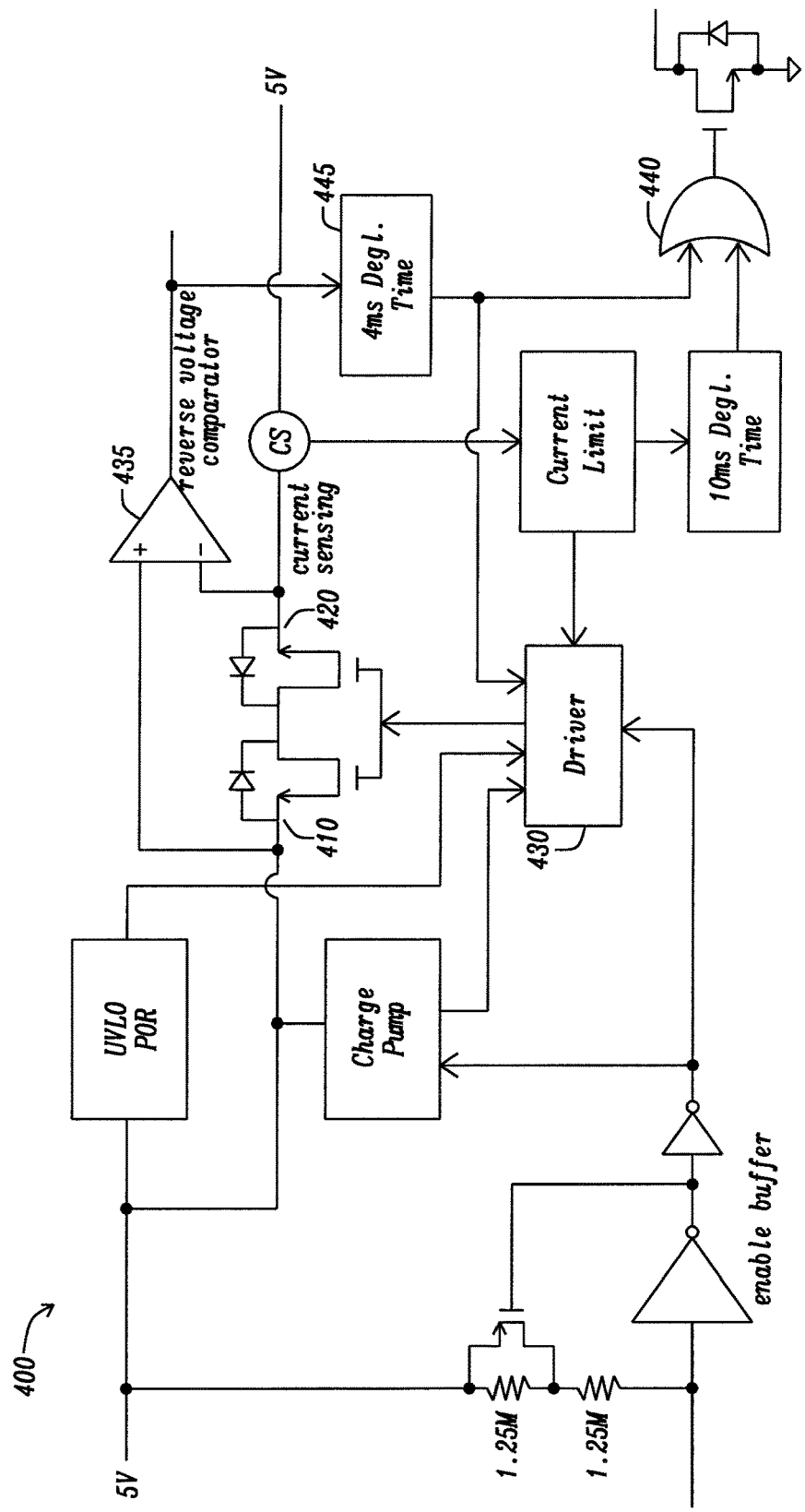
FIG. 4 is a circuit diagram of a switch circuit according to the prior art.

FIG. 4 shows a switch circuit used for relaying a 5V potential, according to the prior art. The switch circuit 400 comprises a first transistor 410 coupled to a second transistor 420. The transistor 410 has a source connected to a 5V input and a drain connected to a drain of the second transistor 420. The second transistor 420 has a source connected to an output. A driver 430 is connected to a gate of the transistor 410 and to the gate of the transistor 420 respectively. A reverse voltage comparator 435 has a first input connected to the source of the first transistor 410, a second input connected to the source of the second transistor 420 and an output coupled to a logic gate 440 via a deglitching circuitry delay 445.

In operation, the comparator 435 compares the source voltage of the second transistor with the source voltage of the first transistor. When the output voltage exceeds the input voltage by 135 mV for 4 ms the reverse-voltage protection feature turns off the N-channel MOSFET. A fault signal is also provided to stop normal operation. Such a switch circuit is adapted for low voltage applications but is not suitable for high voltage applications.

In the case of a high voltage switching converter, the voltage of the switching node varies across a relatively large range. For instance, the switching node voltage may vary between −5V and 26V. At high voltage, the common gate control voltage would result in incorrect switching of at least one switch, and may also result in gate-oxide damage due to excessive gate source voltage.

Figure 5:
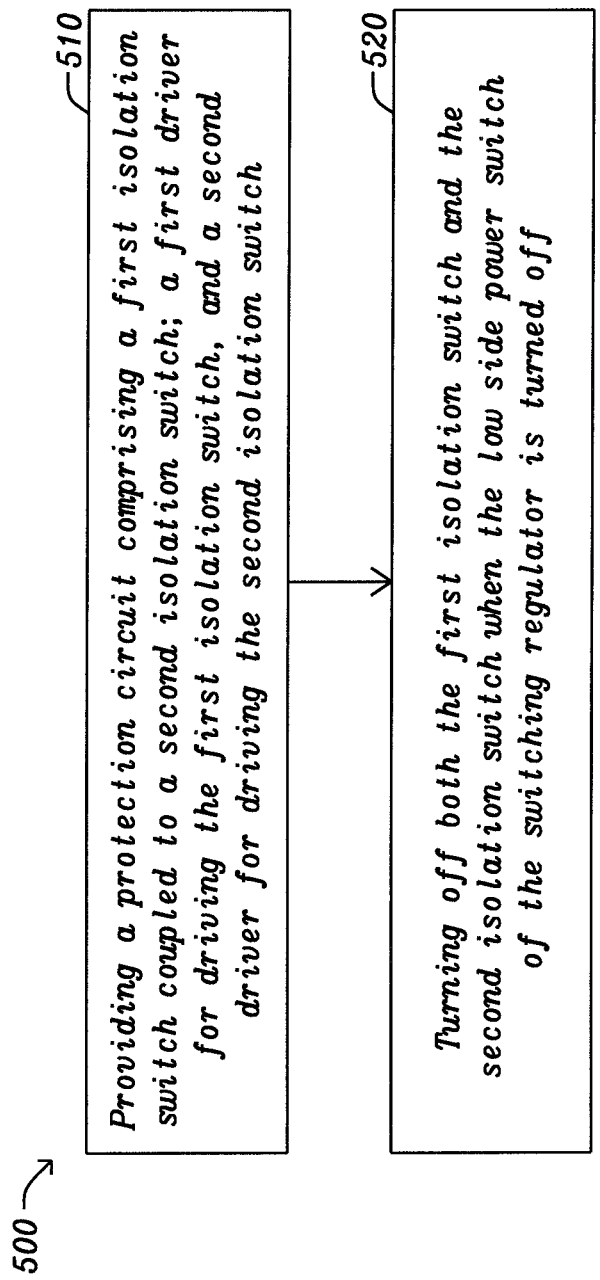
FIG. 5 is a flow chart of a method of operating a power supply according to the disclosure.

FIG. 5 illustrates a method of operating a power supply comprising a first power switch coupled to a second power switch via a switching node, according to the present disclosure. The first power switch is provided between an input and the switching node and is also referred to as the high side power switch. The second power switch is provided between the switching node and a ground and is also referred to as the low side power switch.

At step 510 a protection circuit is provided comprising a first isolation switch coupled to a second isolation switch; a first driver for driving the first isolation switch, and a second driver for driving the second isolation switch.

At step 520 the first isolation switch and the second isolation switch are both turned off (open) when the low side power switch of the switching regulator is turned off.

For example, the method may comprise turning off both the first isolation switch and the second isolation switch when the first power switch and the second power switch are both turned off.

This approach can be used to isolate a low voltage domain from a high voltage domain. In addition, this method also prevents current leakages from occurring during switching dead times.

Figure 6:
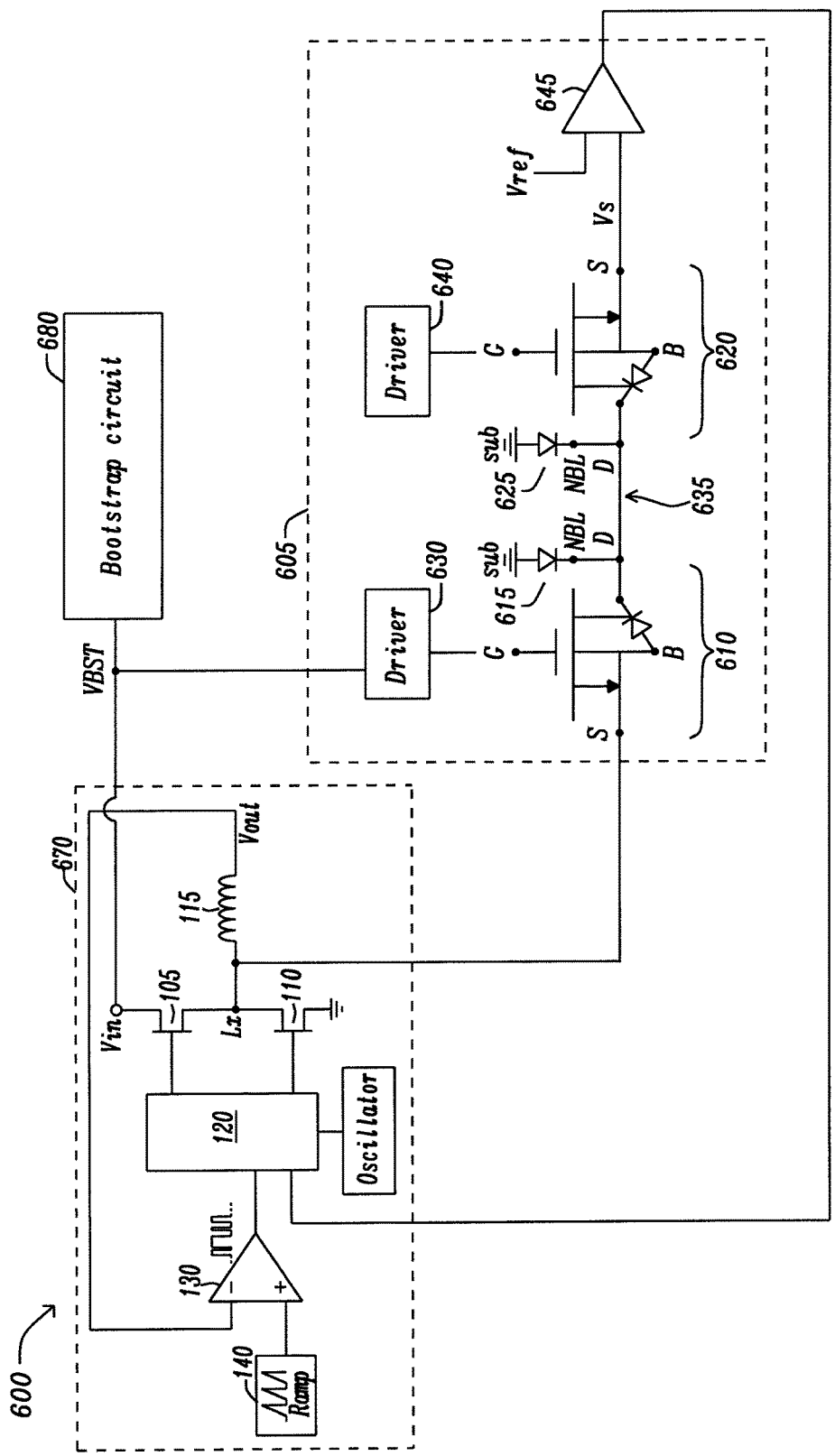
FIG. 6 is a circuit diagram of a buck converter provided with a protection circuit according to the disclosure.

FIG. 6 illustrates a power supply 600 for implementing the method of FIG. 5. The power supply 600 includes a switching converter 670 coupled to a protection circuit 605, adapted for high voltage applications.

In this example the switching converter 670 is a buck converter. The components of the buck converter have reference numeral as indicated above and shown in FIG. 1. The power switch 105 and the power switch 110 may be provided by two NMOS transistors.

A bootstrap circuit 680 for providing a bootstrap voltage, VBST, has an output couple to the input of the switching converter, at the first terminal of the high side power switch 105.

The protection circuit 605 comprises a first isolation switch 610 coupled to a second isolation switch 620. The first isolation switch and the second isolation switch may each be provided by a transistor such as a bipolar junction transistor BJT or a field effect transistor FET. For example, the transistor may be a transistor designed with a high breakdown voltage such as a laterally diffused MOSFETs, LDMOS. For instance, a drain to source breakdown voltage may be greater than 50V. In the present example, the first isolation switch 610 is an NMSO transistor having a source connected to the switching node Lx of the switching converter and a drain connected to a drain of the second isolation switch 620. The first isolation switch 610 includes a parasitic diode 615 connected between the drain of the first isolation switch and the substrate of the integrated circuit. The isolation switch 620 is an NMOS transistor having a source connected to the core. The second isolation switch 620 includes a parasitic diode 625 connected between the drain of the second isolation switch 620 and the substrate of the integrated circuit.

A gate of the first transistor 610 is coupled to a first driver 630. The first driver 630 has an input coupled to the output of the bootstrap circuit 680 for receiving the bootstrapped voltage VBST, and an output for providing a driving signal to the first switch 610. A gate of the second transistor 620 is coupled to a second driver 640. The second driver 640 has an output for providing a driving signal to the second switch 620. A comparator 645 has a first input for receiving a reference voltage Vref and a second input coupled to the source of the second transistor 620. The comparator 645 has an output coupled to the driver 120 of the switching converter 670.

In another example, the power switch 105 of the switching converter may be provided by a pMOS transistor instead of an NMOS transistor. In this case, an additional bootstrap circuit (not shown) would be require to provide the appropriate voltage to the pMOS transistor.

In an alternative embodiment, the first isolation switch 610 and second isolation switch 620 may be provided by two PMOS transistors.

In yet another alternative embodiment the first isolation switch 610 and the second isolation switch 620 may be provided by a first transmission gate and a second transmission gate respectively. For example, the first and or the second transmission gate may include an NMOS transistor connected to a PMOS transistor.

In operation, the comparator 645 compares the source voltage Vs of the second transistor 620 with the reference voltage Vref and outputs an error signal to the driver 120. If the source voltage Vs increases above Vref, the error signal is set high, for example to a logic 1, and the driver 120 turns the high switch 105 off (open).

Figure 7:
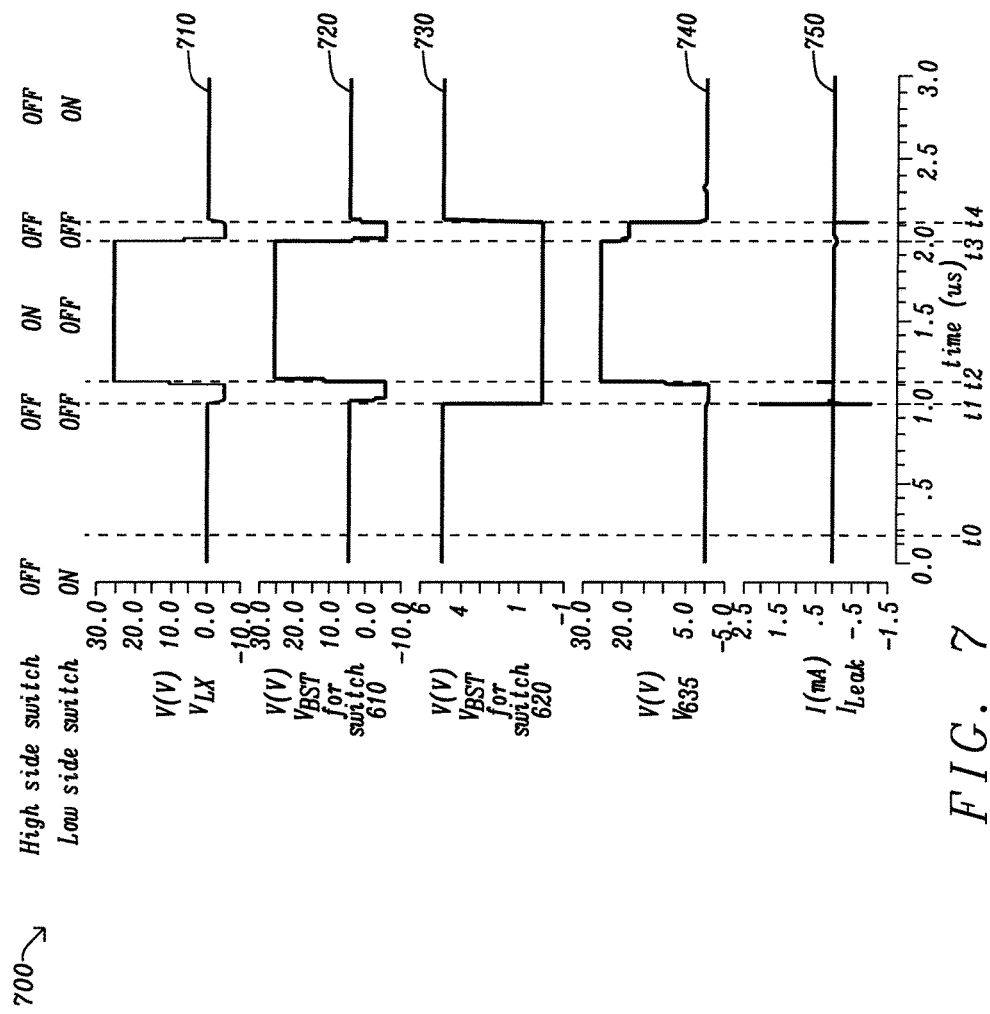
FIG. 7 is a time chart illustrating the working of the circuit of FIG. 6.

FIG. 7 is a timing chart showing the voltage 710 at the switching node Lx; the gate voltage, VBST_charge_HV 720 of the first isolation switch; the gate voltage, VBST_charge_LV 730 of the second isolation switch; the drain voltage 740 common 635 to the first isolation switch and to the second isolation switch; and a leak current I_leak 750 from the substrate of the integrated circuit to the drain terminal.

The switching voltage 710 varies between −5V and +26V following the same variations as switching voltage 310 described with reference to FIG. 3.

Between times t0 and t1, the switching regulator is in a first phase in which the high side power switch is off and the low side power switch in on. The voltage at the switching node Lx is determined by the inductor current flowing through the on-resistance of the low side power switch, which may range from a small negative voltage to a small positive voltage, depending on a direction of the inductor current flow.

During this time, the gate voltage VBST_charge_HV 720 of the first isolation switch and the gate voltage VBST_charge_LV 730 of the second isolation switch are both 5V. Since the voltage at Lx is about 0V, the gate to source voltage Vgs of both the first isolation switch and of the second isolation switch is 5V. The first isolation switch 610 and the second isolation switch 620 are both on (closed). Therefore, the voltage at the switching node Lx is passed on to the comparator input.

Between times t2 and t3, the switching regulator is in a second phase in which the high side power switch 105 is on (closed) and the low side power switch 110 in off (open). The voltage 710 at the switching node Lx is high, about +26V.

During this time, the gate voltage VBST_charge_HV 720 of the first isolation switch is 26V, while the gate voltage VBST_charge_LV 730 of the second isolation switch is 0V. The gate to source voltage Vgs1 of the first isolation switch is given by VLx−Vg1=26−26=0V. The gate to source voltage Vgs2 of the second isolation switch is given by Vs2−

Vg2=0V. The first isolation switch 610 and the second isolation switch 620 are both off (open).

The common drain node is a diode voltage drop lower than the voltage at Lx, about 25.4V, due to forward biasing of the body diode (between terminal B and D) of the first isolation switch. Therefore, the core of the integrated circuit is isolated from the switching node voltage by the second isolation switch 620.

The gate voltage 730 of the second isolation switch 620 varies between about 0V and 5V. Before time t1, the gate voltage 730 is about 5V. At time t1 the voltage 730 decreases to 0V and remains at 0V until time t4. At time t4, the voltage 730 increases to 5V.

Between the times t1 and t2 and the times t3 and t4, the switching regulator is in a third phase in which the high side power switch 105 and the low side power switch 110 are both off (open). During dead time periods t2–t1 and t4–t3, the switching node voltage 710 is negative at −5V.

During the dead times, the gate voltage VBST_charge_HV 720 of the first isolation switch and the gate voltage VBST_charge_LV 730 of the second isolation switch are −5V and 0V respectively. The gate to source voltage Vgs1 of the first isolation switch is given by VLx−Vg1=−5V+5V=0V. The gate to source voltage Vgs2 of the second isolation switch is given by Vs2−Vg2=0V. The first isolation switch 610 and the second isolation switch 620 are both off (open). This prevents the diodes 615 and 625 from becoming forward biased, hence eliminating current leakage from the substrate of the integrated circuit. The leakage current profile 750 shows that no substantial leakage current arises during the dead times.

Between the times t1 and t4, the gate voltage of the first isolation switch matches the voltage at the switching node Lx. The gate-source voltage of the first isolation switch is about 0V when the low side power switch is off (open) and about 5V when the low side power switch is on (closed). The first isolation switch and the second isolation switch are both on (closed) only when the low side switch of the switching regulator is on.

A skilled person will appreciate that variations of the disclosed arrangements are possible without departing from the disclosure. In particular, the disclosure is not limited to buck converters. The teaching of the disclosure could also be applied to other types of switching converters such as boost and buck-boost converters. Accordingly, the above description of the specific embodiment is made by way of example only and not for the purposes of limitation. It will be clear to the skilled person that minor modifications may be made without significant changes to the operation described.

What is claimed is:

1. A power supply comprising:
    a switching converter for providing an output voltage, the switching converter comprising a first power switch coupled to a second power switch via a switching node, and a driver coupled to the first and second power switches; the driver being adapted to operate the first and second power switches with a switching cycle having a switching dead-time during which both the first and the second power switches are turned off; and
    a protection circuit comprising a first isolation switch coupled to a second isolation switch; a first driver for driving the first isolation switch, and a second driver for driving the second isolation switch; wherein the first driver is configured to provide a first voltage to turn off the first isolation switch during the switching dead-time; and wherein the second driver is configured to provide a second voltage to turn off the second isolation switch during the switching dead-time.

2. The power supply as claimed in claim 1, wherein the first isolation switch comprises a first transistor having a first source terminal and a first drain terminal, and wherein the second isolation switch comprises a second transistor comprising a second source terminal and a second drain terminal, wherein the first drain terminal is connected to the second drain terminal; and wherein the first source terminal is connected to the switching node.

3. The power supply as claimed in claim 2, wherein the first transistor is a NMOS transistor and wherein the second transistor is a NMOS transistor.

4. The power supply as claimed in claim 2, wherein the first transistor is a PMOS transistor and wherein the second transistor is a PMOS transistor.

5. The power supply as claimed in claim 1, comprising a bootstrap circuit for providing a bootstrap voltage; the bootstrap circuit being coupled to both the first power switch and to the first driver.

6. The power supply as claimed in claim 1, comprising a comparator comprising a first input coupled to a reference voltage, a second input coupled to the second isolation switch and an output coupled to the driver of the switching converter.

7. The power supply as claimed in claim 1, wherein the first isolation switch comprises a first transmission gate and wherein the second isolation switch comprises a second transmission gate.

8. The power supply as claimed in claim 1, wherein the power supply is a high voltage power supply, and wherein the switching node provides a voltage varying between a negative value and a positive value.

9. A method of operating a power supply comprising a first power switch coupled to a second power switch via a switching node, wherein the first power switch is provided between an input and the switching node and wherein the second power switch is provided between the switching node and a ground; the method comprising the steps of:
    operating the first and second power switches with a switching cycle having a switching dead-time during which both the first and the second power switches are turned off;
    providing a protection circuit comprising a first isolation switch coupled to a second isolation switch; a first driver for driving the first isolation switch, and a second driver for driving the second isolation switch;
    wherein the first driver is configured to provide a first voltage to turn off the first isolation switch during the switching dead-time; and wherein the second driver is configured to provide a second voltage to turn off the second isolation switch during the switching dead-time.

10. The method as claimed in claim 9, comprising turning on both the first isolation switch and the second isolation switch when the second power switch is turned on.

11. The method as claimed in claim 9, wherein the first isolation switch comprises a first transistor having a first source terminal and a first drain terminal, and wherein the second isolation switch comprises a second transistor comprising a second source terminal and a second drain terminal, wherein the first drain terminal is connected to the second drain terminal; and wherein the first source terminal is connected to the switching node.

12. The method as claimed in claim 9, wherein the power supply comprises a bootstrap circuit for providing a bootstrap voltage; the bootstrap circuit being coupled to both the first power switch and to the first driver.

13. The method as claimed in claim 9, wherein the protection circuit comprises a comparator, the method comprising comparing a source voltage of the second isolation switch with a reference voltage and generating an error signal based on the comparison.

14. A protection circuit for use with a switching converter comprising a first power switch coupled to a second power switch via a switching node, and a driver coupled to the first and second power switches;

the driver being adapted to operate the first and second power switches with a switching cycle having a switching dead-time during which both the first and the second power switches are turned off;

the protection circuit comprising a first isolation switch coupled to a second isolation switch; a first driver for driving the first isolation switch, and a second driver for driving the second isolation switch;

wherein the first driver is configured to provide a first voltage to turn off the first isolation switch during the switching dead-time;

and wherein the second driver is configured to provide a second voltage to turn off the second isolation switch during the switching dead-time.

15. The protection circuit as claimed in claim 14, wherein the first isolation switch comprises a first transistor having a first source terminal and a first drain terminal, and wherein the second isolation switch comprises a second transistor comprising a second source terminal and a second drain terminal, wherein the first drain is connected to the second drain; and wherein the first source terminal is connected to the switching node.

16. The protection circuit as claimed in claim 14 comprising a bootstrap circuit for providing a bootstrap voltage; the bootstrap circuit being coupled to both the first power switch and to the first driver.

17. The protection circuit as claimed in claim 14, comprising a comparator comprising a first input coupled to a reference voltage, a second input coupled to the second isolation switch and an output coupled to the driver of the switching converter.

* * * * *